Mar. 5, 1929.  D. L. NATION  1,703,947
NUT LOCK
Filed Dec. 27, 1926
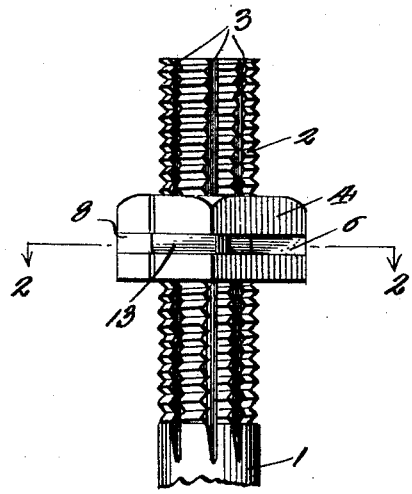
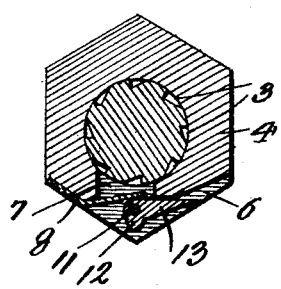
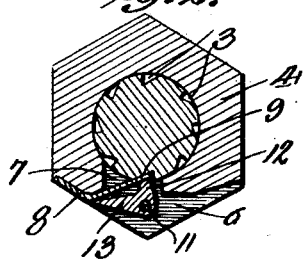
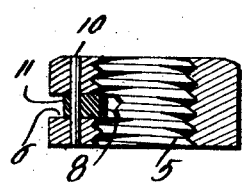
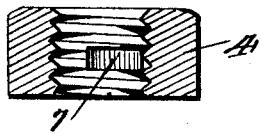
WITNESSES
Inventor
DANIEL L. NATION
Attorney Patented Mar. 5, 1929.

1,703,947

UNITED STATES PATENT OFFICE.

DANIEL LATHORN NATION, OF DENVER, COLORADO.

NUT LOCK.

Application filed December 27, 1926. Serial No. 157,396.

The present invention relates to a nut lock and has for its primary object the provision, in a manner as hereinafter set forth, of a nut lock so designed that the nut can be readily unlocked and removed from a bolt upon which it is secured, as desired.

The invention contemplates the provision of a bolt having the threaded end thereof provided with a series of longitudinally extending notches or grooves, and a nut having a kerf formed in the side thereof and a passage formed from the inner wall of the kerf through to the central portion of the nut. Secured in the kerf is a spring tongue the free end of which overlies the passage and secured adjacent the free end of the spring tongue is a cam member which, upon turning, acts upon the spring tongue to force the same inwardly through the passage for engagement in one of the grooves formed in the bolt shank.

The invention will be best understood from a consideration of the following detailed description taken in connection with the accompanying drawings forming a part of this specification, with the understanding however, that the invention is not confined to any strict conformity with the showing of the drawings but may be changed or modified so long as such changes or modifications mark no material departure from the salient features of the invention as expressed in the appending claim.

In the drawings:

Figure 1 shows a nut and bolt of the character embodying this invention, in side elevation, Figure 2 is a transverse section taken upon the line 2—2 of Figure 1, showing the nut locked to the bolt, Figure 3 is a section similar to the section shown in Figure 2 showing the nut unlocked from the bolt, Figure 4 is a vertical section through the nut, and Figure 5 is a vertical section through the nut taken at right angles to the section as shown in Figure 4.

Referring to the drawings in detail wherein like numerals of reference indicate corresponding parts throughout the several views, the numeral 1 indicates a bolt shank having the threads 2 formed thereon and extending throughout the threaded portion of the shank is a series of longitudinally extending grooves 3, one wall of each groove being formed substantially radially of the bolt shank while the other wall of the groove is formed at an angle to the first wall.

Threaded upon the shank 1 is a nut 4 having the usual interior threads 5 which are designed to engage the threads of the shank. Formed transversely of the nut body in the side walls thereof, is a kerf 6 of substantially V-form and arranged with its apex outermost. The kerf gradually increases in depth from its ends toward its center. A passage 7 extends from the central portion of the kerf 6 to bore of the nut 4. A spring tongue or pawl 8 of angular formation, is secured to the bottom wall of the kerf 6 at one side of the passage 7 and with one of its arms in full abutting contact with said wall. The other or free arm 9 of the spring tongue or pawl 8 extends inwardly from the fixed arm of the pawl and has its free end arranged within the passage 7.

Fitted in the nut body 4 in a position to pass transversely through the kerf 6 at a point adjacent the outer side of the free arm 9 of the spring tongue or pawl 8, is a pivot pin 10 and upon this pin between the upper and lower walls of the kerf there is pivotally arranged a cam member 11. As is shown in Figure 3, when the nut is not locked to the shank of the bolt the free arm 9 of the spring tongue or pawl 8 bears against the cam head and when the cam 11 is turned the enlarged portion 12 of the head will be thrown against the arm 9 and force the free end thereof inwardly for engagement in one of the grooves 3 of the shank. The cam arm 13 swings about and engages the arm 9 adjacent the point where it is secured to the nut body 4, when this operation has taken place and when the spring tongue is released from engagement with the shank 1 then the arm 13 of the cam swings completely around until the extended portion 12 of the cam is directed outwardly for the release of the spring tongue pawl.

From the foregoing description it will be readily seen that when the nut 4 is threaded upon the bolt shank 1, to the proper point, it can be readily and securely fastened to the shank by simply swinging the cam member 11 thus forcing the free arm 9 of the spring tongue or pawl 8 inwardly to engage in one of the grooves 3 of the shank. In addition to locking the nut on the bolt, the spring tongue or pawl 8 functions to hold the cam 11 in active position and in inactive position, as shown in Figures 2 and 3, respectively. When the spring tongue or pawl 8 is in either of these positions, it is arranged wholly within the kerf. When the spring tongue or pawl 8 is in active position its extension 12 and the free end of its arm 13 contact with the pawl arm 9 and hold the pawl arm against buckling, with the result that the nut is positively locked to the bolt.

Having thus described my invention, what I claim is:

In a nut lock, a bolt having its screw threaded portion provided with longitudinally extending grooves, a nut provided with a kerf opening laterally thereof and of substantially V-form, the kerf being arranged with its apex outermost and gradually increasing in depth from its ends toward its center, the nut being provided with a passage extending from the center of the kerf to the bore of the nut, an angular spring pawl having one of its arms secured to the bottom wall of the kerf in full abutting contact therewith and having its free arm extending inwardly into the passage, and a cam pivoted within the kerf outwardly of the free arm of the pawl and having an extended portion and an arm, said portion and arm contacting with the outer side of the free arm of the pawl to permit the pawl arm to hold the cam against accidental movement and to permit the cam to prevent the buckling of the pawl arm, the cam being arranged wholly within the kerf when in said active position and when in inactive position and being adapted to be held against accidental movement when in inactive position by the pawl arm.

In testimony whereof I affix my signature.

DANIEL LATHORN NATION.